United States Patent [19]

Tsuboi

[11] Patent Number: 4,638,741
[45] Date of Patent: Jan. 27, 1987

[54] PRECISION ROLLER ATTACHMENT FOR AUTOMATION PROCESSION

[76] Inventor: Nobuyuki Tsuboi, 2-1, Okayama 5-Chome, Shijonawate City, Osaka 575, Japan

[21] Appl. No.: 415,904

[22] Filed: Sep. 8, 1982

[51] Int. Cl.⁴ .............................................. B61B 13/04
[52] U.S. Cl. ..................... 105/141; 104/118; 104/247; 16/102; 428/137; 428/172; 105/144
[58] Field of Search .................. 105/141, 1 A, 144; 104/118, 245–247, 242, 119; 191/49, 59, 59.1, 63, 63.1, 63.5, 57, 29, 29 DM; 308/3 R, 3 A, 3 B, 3 C, 3 CH, 3.5, 3.8, 6 B; 428/137, 156, 172; 16/91, 97, 98, 102, 106

[56] References Cited

U.S. PATENT DOCUMENTS

| | | | |
|---|---|---|---|
| 2,136,766 | 11/1938 | Tegge | 191/29 |
| 3,575,454 | 4/1971 | Meeker | 104/246 X |
| 3,872,793 | 3/1975 | Patin | 104/119 X |
| 4,068,767 | 1/1978 | Tippetts | 214/6 BA |
| 4,081,091 | 3/1978 | Thorley | 214/75 R |
| 4,423,685 | 1/1984 | Kerckhett | 16/106 X |

Primary Examiner—Robert B. Reeves
Assistant Examiner—Glenn B. Foster
Attorney, Agent, or Firm—Sandler & Greenblum

[57] ABSTRACT

A roller attachment to facilitate precise running of an article along a guide line in automation processes when it is fixed to the article, having an angular frame which is formed by layering punched angular thin members in the longitudinal direction of frame, and which is provided with peripheral recesses including rollers in a way to rotate freely in the longitudinal direction of frame in relation to the frame, the frame being attachable to the article with bolts either through hollow rivets uniting the angular thin members together or through elongated bolt holes in bracket members.

8 Claims, 26 Drawing Figures

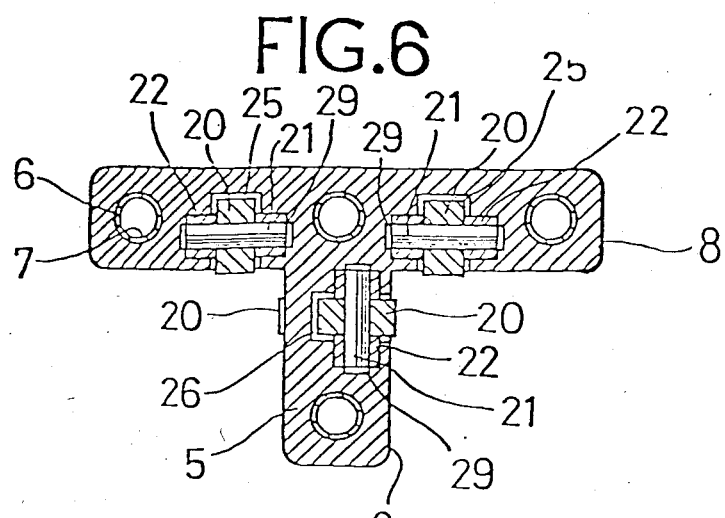
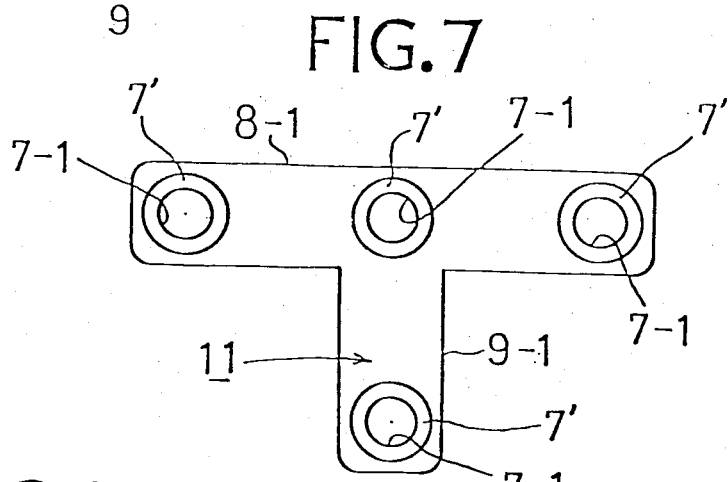
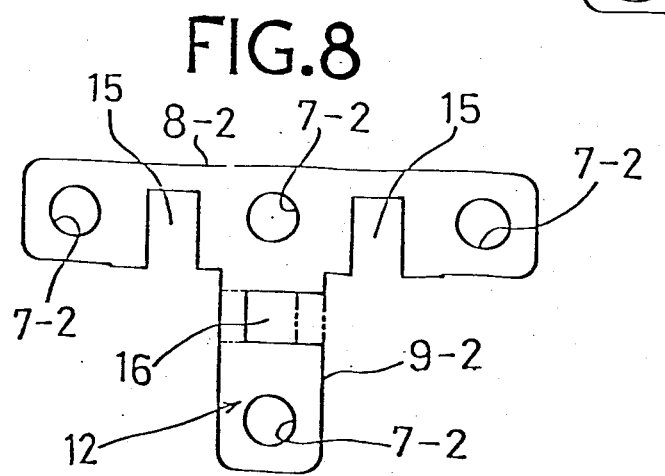

PRECISION ROLLER ATTACHMENT FOR AUTOMATION PROCESSION

BACKGROUND OF THE INVENTION

The present invention relates to a roller device, and more particularly to a roller attachment which can be put on an article to facilitate its running along a straight and/or curved line.

In automation processes especially with industrial robots, various shapes, sizes and weights of materials are moved along straight and/or curved guide lines of various cross sections and running directions in various operating conditions. If the materials are not moved precisely, they connot be processed satisfactorily however precisely the machine tools or robots may be constructed and operated.

Conventionally there are various kinds of roller attachments to facilitate running of materials along guide lines in production processes, but they cannot usually meet the requirement of precise movement in automation processes especially with robots. Moreover, roller attachments for precise movement cannot be manufactured, assembled and attached easily. And such may not permit of light and noiseless running with negligible maintenance.

SUMMARY OF THE INVENTION

It is therefore a main object of the invention to provide a roller attachment to facilitate precise running of articles with various shapes, sizes and weights along straight and/or curved guide lines of various cross sections and running directions.

Another object of the invention is to provide a roller attachment which can be manufactured, assembled and attached easily.

A further object of the invention is to provide a roller attachment which permits of light and noiseless running with negligible maintenance.

A roller attachment in accordance with the invention has a plurality of substantially angular thin members so layered in one direction as to form a frame of desired angular configuration, and also has a plurality of rollers so arranged in peripheral recesses of the frame as to rotate freely in the above-mentioned layering direction in relation to the frame.

The angular thin members have aligned holes which sever dually to receive rivets therethrough to unite them to be the frame and to receive bolts therethrough to attach the frame to an article to be moved along a guide line. Alternatively, the frame can be attached to an article by means of bracket members provided to end members of the frame.

The article moves along the guide line with the rollers being in rolling relations to desired surfaces of the guide line.

BRIEF DESCRIPTION OF THE DRAWINGS

Having thus generally described the nature of the invention, reference will now be made to the accompanying drawings in which preferred embodiments thereof are shown by way of illustration, and in which:

FIG. 6 is a vertical section taken approximately on the line C—C in FIG. 2;

FIG. 7 is a front view of an end member of the frame in FIG. 4;

FIG. 8 is a front view of an intermediate member of the frame in FIG. 4, where an alternative mode of a rectangular normal slot is shown in chain lines;

DESCRIPTION OF PREFERRED EMBODIMENTS

Referring to FIGS. 1 through 11, the roller attachment embodying the invention is wholly designated as 1, and has a plurality of angular thin members 11, 12 and 13 layered in one direction. They are united together with hollow rivets 6, and thus form a substantially angular frame 5 of roller attachment 1.

Figure 1:
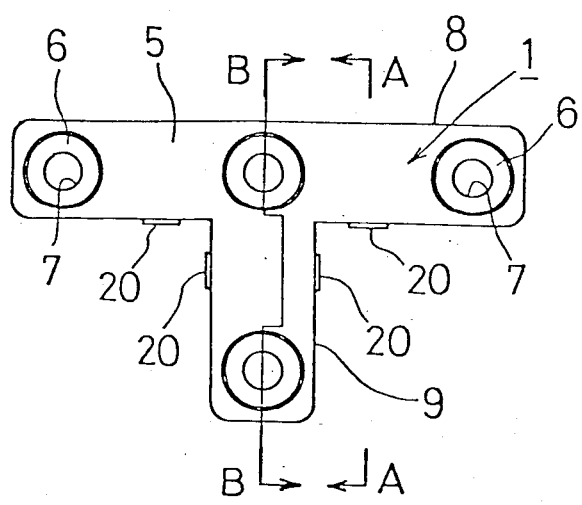
FIG. 1 is a front view of a roller attachment embodying the invention.

The angular frame 5 comprises an upper horizontal bar-like part 8 and a central vertical bar-like part 9 extending downward from the horizontal bar-like part 8. Thus the frame 5 has a substantially T-letter shape outer periphery as best shown in FIG. 1. The layering direction of angular thin members 11, 12 and 13 is the longitudinal direction of frame 5.

The angular frame 5 is provided with a plurality of longitudinal rivet holes 7, through which provided are the hollow rivets 6.

Figure 2:
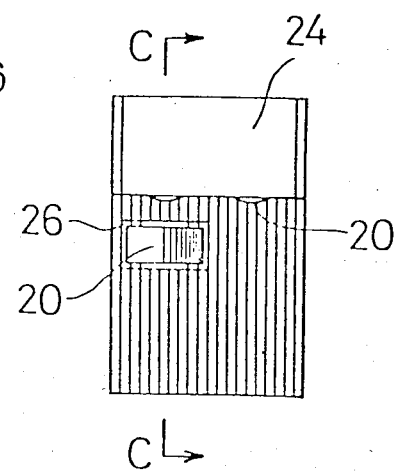
FIG. 2 is a right side view of the embodiment in FIG. 1.
Figure 3:
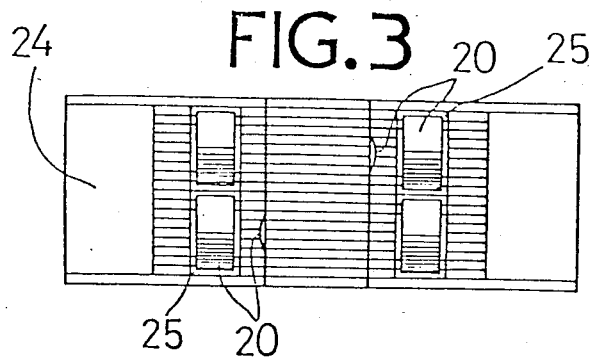
FIG. 3 is a bottom end view of the embodiment in FIG. 1.

The roller attachment 1 also has a plurality of rollers 20 provided in recesses 25 and 26 which are set normally in the T-letter shape outer periphery of frame 5. The recesses 25 extend normally from a lower side of the horizontal bar-like part 8, and the recesses 26 are set normally in both sides of the vertical bar-like part 9, as best shown in FIGS. 2 and 3.

As best shown in FIG. 6, each roller 20 is supported with a pin 21 in a freely rotatable relation to it, and each pin 21 is supported with a pair of journal bearings 22 in a freely rotatable relation to them. The pins 21 and journal bearings 22 are provided in recesses 29 which traverse the normal recesses 25 and 26 at right angles with them respectively. Each journal bearing 22 is in a stationarily supported relation to the corresponding traversal recess 29. All the rollers 20 are freely rotatable in the longitudinal direction of frame 5 in relation to it, the rollers provided in the normal recesses 25 being at right angles with the rollers provided in the normal recesses 26.

Each angular thin member 11 has the configuration best shown in FIG. 7. It comprises an upper horizontal part 8-1 and a central vertical part 9-1 extending downward from the horizontal part 8-1. Thus the angular thin member 11 has a substantially T-letter shape outer periphery.

The angular thin member 11 is provided with a plurality of rivet holes 7-1. Each rivet hole 7-1 is provided with a spot face 7'.

Each angular thin member 12 has the configuration best shown in FIG. 8. It comprises an upper horizontal part 8-2 and a central vertical part 9-2 extending downward from the horizontal part 8-2. Thus the angular thin member 12 has a substantially T-letter shape outer periphery. The "T" of thin member 12 has the same shape and size as that of 11.

The angular thin member 12 is provided with a plurality of rivet holes 7-2. The shape, size, position and number of rivet holes 7-2 are the same as those of 7-1.

The thin member 12 is further provided with three rectangular slots 15 and 16 which are set normally in the T-letter shape outer periphery of thin member 12. The slots 15 are set normally in a lower side of the horizontal part 8-2, and the slot 16 is set normally in either right or left side of the vertical part 9-2, as best shown in FIG. 8 where the rightward slot is shown in dark lines and the leftward one is shown in chain lines.

Figure 9:
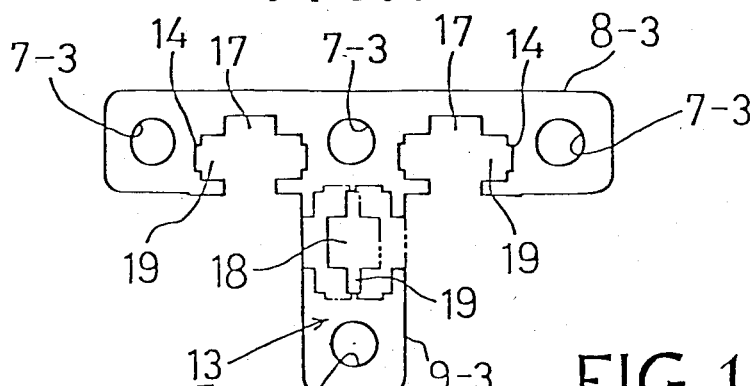
FIG. 9 is a front view of a middle member of the frame in FIG. 4, where an alternative mode of a rectangular normal slot in connection with a rectangular traversal slot is shown in chain lines.

Each angular thin member 13 has the configuration best shown in FIG. 9. It comprises an upper horizontal part 8-3 and a central vertical part 9-3 extending downward from the horizontal part 8-3. Thus the angular thin member 13 has a substantially T-letter shape outer periphery. The "T" of thin member 13 has the same shape and size as that of 12.

The angular thin member 13 is provided with a plurality of rivet holes 7-3. The shape, size, position and number of rivet holes 7-3 are the same as those of 7-2.

The thin member 13 is further provided with three rectangular slots 17 and 18 which extend normally from the T-letter shape outer periphery of thin member 13. The slots 17 are set normally in a lower side of the horizontal part 8-3, and the slot 18 is set normally in either right or left side of the vertical part 9-3, as best shown in FIG. 9 where the rightward slot is shown in dark lines and the leftward one is shown in chain lines. The normal slots 17 and 18 have the same shape, size and position as 15 and 16 respectively.

The thin member 13 is still further provided with three rectangular slots 19 which traverse the normal slots 17 and 18 at right angles with them respectively. In FIG. 9 the rectangular slot 19 which traverses the rightward normal slot 18 is shown in dark lines, while that which traverses the leftward one is shown in chain lines. Each traversal slot 19 is provided with stepping ends 14.

Figure 4:
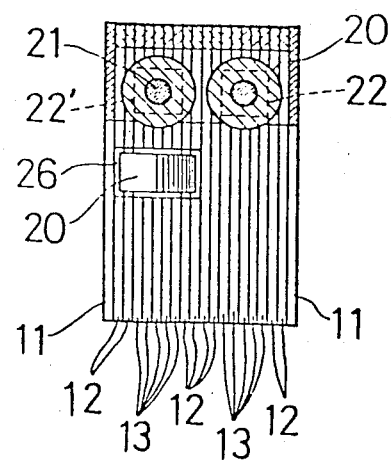
FIG. 4 is a vertical section taken approximately on the line A—A in FIG. 1.
Figure 5:
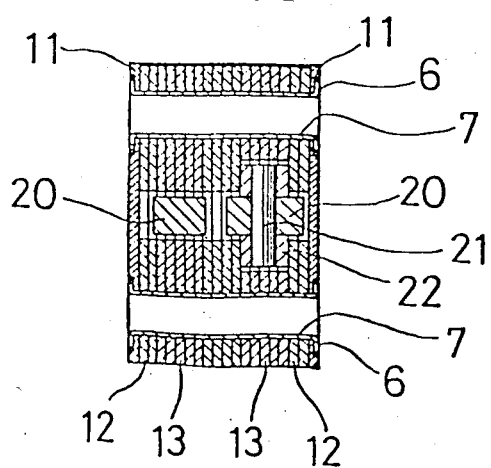
FIG. 5 is a vertical section taken approximately on the line B—B in FIG. 1.

The frame 5 is composed with a pair of the angular thin members 11 at both ends, a plurality of the angular thin members 13 in middle portions longitudinally in two rows and a plurality of the angular thin members 12 intermediate them, as best shown in FIGS. 4 and 5. All the angular thin members 11, 12 and 13 have a given thickness.

The upper horizontal parts 8-1, 8-2 and 8-3 of angular thin members 11, 12 and 13 are layered together to be the upper horizontal bar-like part 8 of frame 5, while the central vertical parts 9-1, 9-2 and 9-3 of angular thin members 11, 12 and 13 are layered together to be the central vertical bar-like part 9 of frame 5.

The rivet holes 7-1, 7-2 and 7-3 of angular thin members 11, 12 and 13 are aligned together to be the rivet holes 7 of frame 5 respectively.

The normal slots 15 and 17 of angular thin members 12 and 13 are aligned together to be the normal recesses 25 of frame 5 respectively. The normal slots 16 and 18 of angular thin members 12 and 13 are aligned together to be the normal recesses 26 of frame 5 respectively; the rightward slots of thin members 12 and 13 are aligned together to be the rightward recess of frame 5, while the leftward slots of thin members 12 and 13 are aligned together to be the leftward recess of frame 5.

The traversal slots 19 of angular thin members 13 are aligned together to be the traversal recesses 29 of frame 5 respectively.

Each journal bearing 22 has an outer periphery of square cross section 22' as shown in dotted lines in FIG. 4. Each side of the square cross section is equal to the width of a traversal slot 19. Accordingly, the total thickness of angular thin members 13 employed for a roller 20 is equal to the width of a traversal slot 19.

A metallic tape 24 is provided to cover surfaces of the upper horizontal bar-like part 8 of frame 5 as shown in FIGS. 2 and 3.

Figure 10:
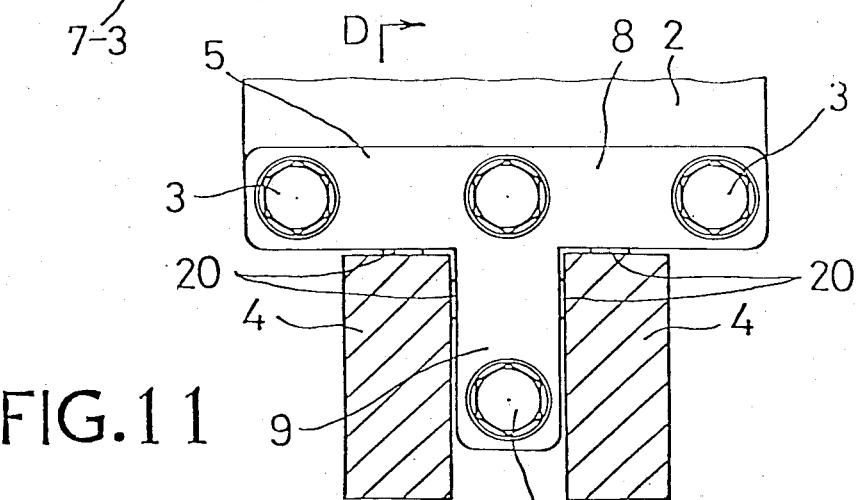
FIG. 10 shows the embodiment in FIG. 1, when it is attached to an article and runs along a pair of guide rails.
Figure 11:
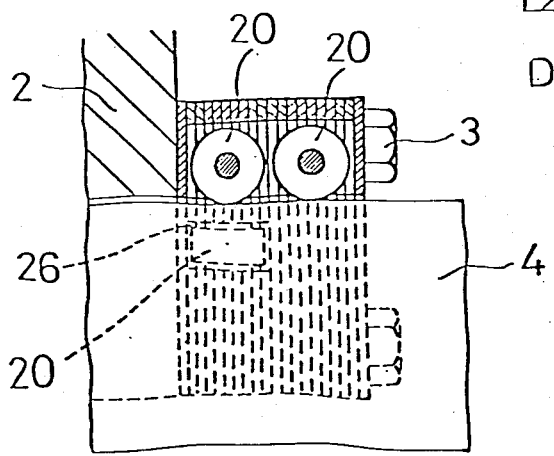
FIG. 11 is a vertical section taken approximately on the line D—D in FIG. 10.

As shown in FIGS. 10 and 11, the roller attachment 1 can be attached to an article 2 in a fixed relation to it by providing bolts 3 through the hollows of rivets 6 respectively, and the article 2 can run along a guide line which comprises a pair of parallel rails 4. Each guide rail 4 has a rectangular cross section.

In this case, the upper horizontal bar-like part 8 of frame 5 bridges the parallel rails 4, and the central vertical bar-like part 9 of frame 5 is inserted between the rails 4. Thus the rollers 20 provided in the normal recesses 25 are in rollable relations to upper surfaces of the rails 4, and the rollers 20 provided in the normal recesses 26 are in rollable relations to side surfaces of the rails 4, respectively, the former roller being at right angles with the latter rollers.

The longitudinal direction of frame 5 corresponds to the running direction of rails 4. All the rollers 20 are in a freely rollable relation to the guide rails 4 in the running direction of rails 4.

The guide rails 4 are fixed to a stationary supporting structure (not shown). And the article 2 may be a material to be processed in an automation system especially with industrial robots (not shown). The article 2 may be moved by suitable driving means (not shown).

The angular thin members 11, 12 and 13 are usually made by punching a rigid thin plate material, such as metal and synthetic resin, of a given thickness. Therefore a large number of such angular thin members can be easily manufactured with high precision in shape and size at substantially low cost.

The frame 5 can be assembled merely by layering the angular thin members 11, 12 and 13 one after another while the rivets 6 are provided through the rivet holes 7-1, 7-2 and 7-3, and putting the rollers 20 together with the pins 21 and journal bearings 22 into the recesses 25, 26 and 29 during the layering of angular thin members 12 and 13. It will facilitate putting the journal bearings 22 into the recesses 29 firmly that the outer periphery of each journal bearing 22 has a square cross section 22'.

Since the angular thin members 11, 12 and 13 are shaped and sized with high precision, they can be united toether into the frame 5 with excellent alignment and integrity. Thus the frame 5 can be assembled with high precision.

The frame 5 can be attached easily and firmly to an article 2 merely by providing bolts 3 through the hollows of rivets 6. The high precision in shape, size and assembling of frame 5 will permit of attaching it to the article 2 with high precision.

The high precision in shape, size, assembling and attaching is indispensable for the roller attachment 1 to run precisely along the guide rails 4 and any other guide line.

Since the upper horizontal bar-like part 8 bridges the parallel rails 4 with the control vertical bar-like part 9 being inserted between the rails 4, the frame 5 will be quite well balanced over the rails 4, and can run along the rails 4 quite assuredly without a possibility of running off the rails 4 practically.

Moreover, the frame 5 can run along the guide rails 4 without zigzaging and swinging to either side considerably, even in case the guide rails 4 have not only a straight but also a curved course, because the rollers 20 in the upper horizontal bar-like part 8 tread upper surfaces of the rails 4 while the rollers 20 in the central vertical part 9 tread side surfaces of the rails 4, the former rollers being at right angles with the latter rollers.

Thus the roller attachment 1 which is precisely manufactured, assembled and attached can run along the guide rails 4 in quite a well balanced state without zigzaging and swinging to either side considerably, even in case the guide rails 4 have not only a straight but also a curved course. Therefore the roller attachment 1 can facilitate running of the article 2 with high precision along a straight and/or curved guide line.

In addition, each roller 20 treads the guide rail 4 with its full width being always in contact with the rail surface. This feature and the above-described well balanced running without considerable zigzaging and swinging make it possible for the roller attachment 1 to run along the guide rails 4 in quite a light and noiseless manner.

The rollers 20 are usually made of synthetic resin or oil-less metal. These materials require no lubrication, and there will usually be no need of maintenance during the service of rollers 20.

In may be good that some of the angular thin members 11, 12 and 13 are made of a material different from the others for a special purpose. For instance, some of the angular thin members 12 and 13 may be made of a magnetic material so that the roller attachment 1 may cooperate with some electromagnetic means (not shown) if provided along the guide rails 4.

The length of roller attachment 1 can be increased desiredly with ease by increasing the longitudinal rows of rollers 20 and angular thin members 12 and 13.

It may be good that at least one of the rollers 20 is made of a material different from the others.

It is possible to substitute a roller 20, a pin 21 and a pair of journal bearings 22 for a minature roller bearing, an arbor and a pair of sleeves which are known in all aspects except that the outer end of each sleeve has an outer periphery of square cross section just like 22' of the journal bearing 22.

Since the angular thin members 11, 12 and 13 are made by punching, various desired configurations of such members can be made with ease, for instance, as shown in FIGS. 12 through 16.

Figure 12:
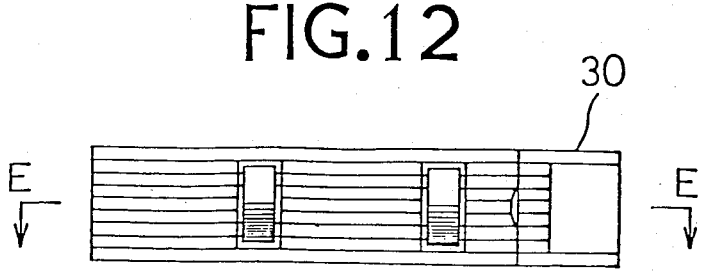
FIG. 12 shows a modification of the embodiment in FIG. 3.
Figure 13:
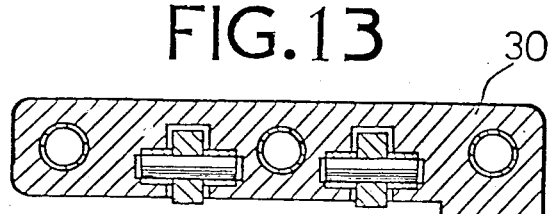
FIG. 13 is a vertical section taken approximately on the line E—E in FIG. 12.

In FIGS. 12 and 13 each angular thin member has a substantially L-letter shape outer periphery, and thus a substantially L-letter shape frame 30 is formed with such angular thin members. In this instance, the roller attachment is provided with one longitudinal row of rollers.

Figure 14:
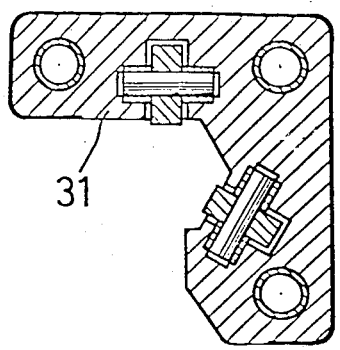
FIG. 14 shows a modification of the embodiment in FIG. 13.

In FIG. 14 the roller attachment has a frame 31 which is composed with angular thin members with a modified L-letter shape outer periphery. In this instance, the roller attachment is provided with a pair of rollers at an acute angle with each other.

Figure 15:
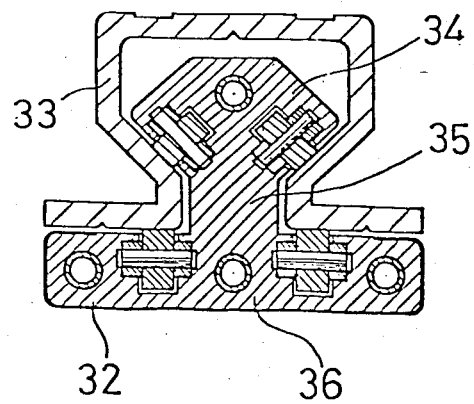
FIG. 15 shows a modification of the embodiment in FIG. 14, when it runs along a guide channel.

In FIG. 15 the roller attachment has a frame 32 which comprises a head part 34, a web part 35 and a base part 36 integrally. Even such a complicated form of frame can be easily composed with angular thin members so punched. In this instance, the roller attachment runs along a guide line which comprises a channel 33.

The relation of frame 32 and guide channel 33 may be especially suitable for the roller attachment to run along the guide channel 33 as it is suspended from the guide channel 33. This relation of frame 32 and guide channel 33 may be well usable not only in case the guide channel 33 runs horizontally but also in case it runs vertically or slopingly.

Figure 16:
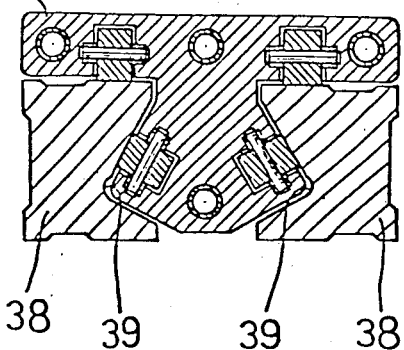
FIG. 16 shows a modification of the embodiment in FIG. 15, when it runs along a pair of guide rails.

In FIG. 16 the roller attachment has a frame 37 with a configuration similar to upside down of 32. And this complicated form of frame can also be easily composed with angular thin members so punched. In this instance, the roller attachment runs along a pair of guide rails 38 with side grooves 39.

The relation of frame 37 and guide rails 38 may also be well usable not only in case the guide rails 38 run horizontally but also in case they run vertically or slopingly.

And the great variety of frame configuration and roller arrangement, for instance shown in FIGS. 1 through 16, makes the roller attachment in accordance with the invention applicable to various shapes, sizes and weights of articles.

Thus it can be seen that the roller attachment in accordance with the invention can facilitate precise running of articles with various shapes, sizes and weights along straight and/or curved guide lines of various cross sections and running directions.

It is possible that a plurality of the roller attachments 1, for instance shown in FIGS. 1 through 9, are fixed to a stationary supporting structure (not shown) by providing bolts 3 through the hollows of rivets 6 respectively, instead that they are fixed to articles 2 to move along a guide line. In this case, articles 2 of a relatively long configuration can run along the stationary supporting structure in a rolling relation to the roller attachments.

The embodiment shown in FIGS. 17 through 20 is fundamentally similar to the embodiments shown in FIGS. 1 through 16. The like numbers indicate the like members.

In FIGS. 17 through 20 the roller attachment has a frame 40 with a substantially L-letter shape outer periphery. At both ends the frame 40 has a pair of angular thin members 41 which have a greater thickness than the other angular thin members 12 and 13. And each angular thin member 41 is provided with a bracket 42 formed by bending a part of the thin member 41.

Figure 17:
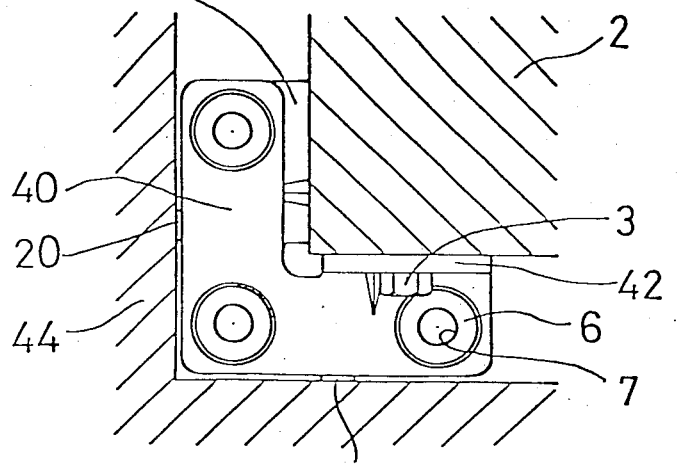
FIG. 17 is a front view of another embodiment of the invention, when it is attached to an article and runs along a guide corner structure.
Figure 18:
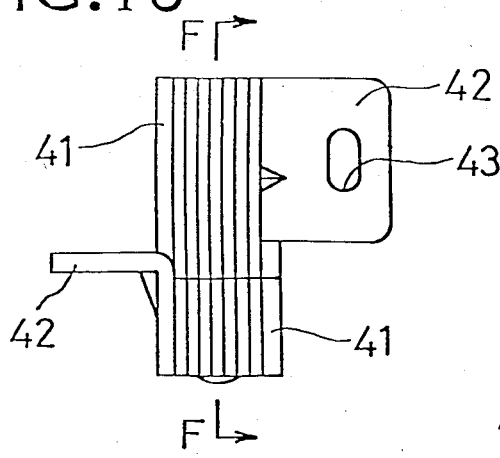
FIG. 18 is a right side view of the embodiment in FIG. 17, where the article, guide corner structure and set bolt are excluded.
Figure 19:
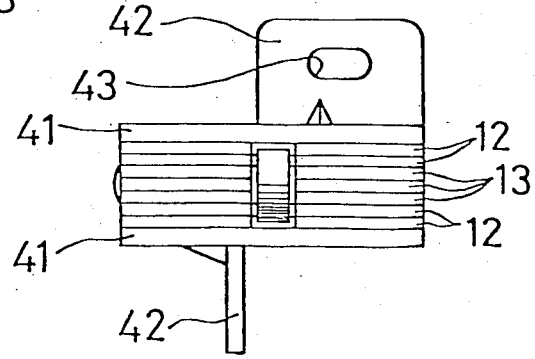
FIG. 19 is a bottom end view of the embodiment in FIG. 18.
Figure 20:
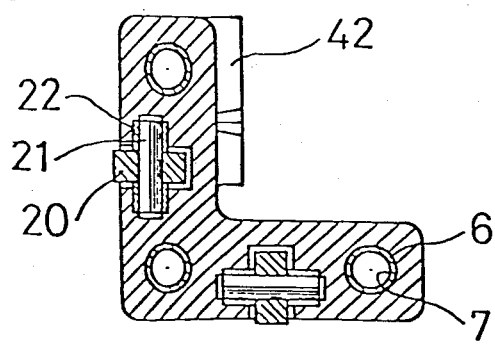
FIG. 20 is a vertical section taken approximately on the line F—F in FIG. 18.

The bracket 42 is provided with an elongated bolt hole 43 as shown in FIGS. 18 and 19. The roller attachment can be fixed to an article 2 by providing bolts 3 through the elongated holes 43 in a suitable relation to the article 2 as shown in FIG. 17.

The roller attachment in FIG. 17 is provided with rollers at the outside of "L", and runs along a guide line which comprises a corner structure 44.

Figure 21:
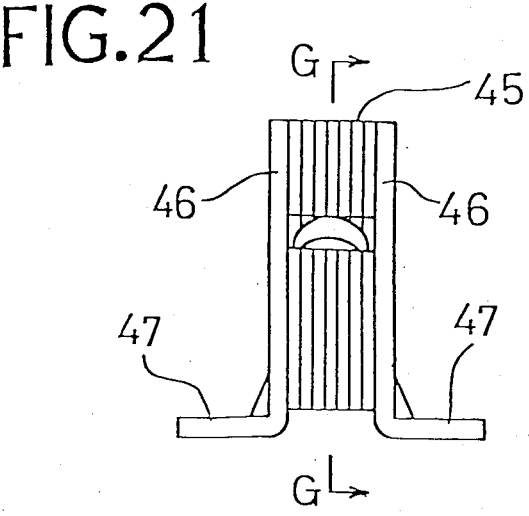
FIG. 21 shows a modification of the embodiment in FIG. 18.
Figure 22:
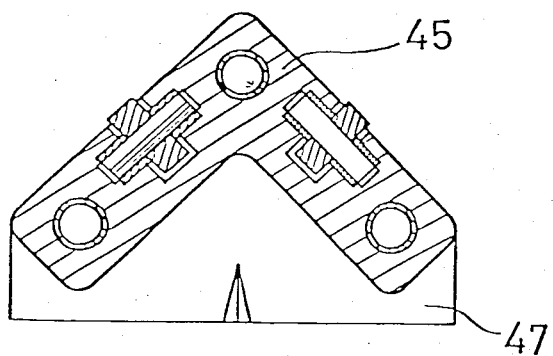
FIG. 22 is a vertical section taken approximately on the line G—G in FIG. 21.

In FIGS. 21 and 22 the roller attachment has a frame 45 with a substantially V-letter shape outer periphery. At both ends the frame 45 is provided with a pair of angular thin members 46 which have brackets 47 extending forward and rearward of the frame 45 symmetrically. The roller attachment is provided with rollers at the outside of "V".

Figure 23:
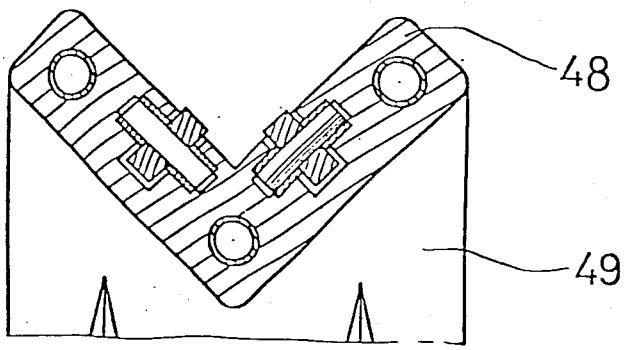
FIG. 23 shows a modification of the embodiment in FIG. 22.

In FIG. 23 the roller attachment has a frame 48 with a substantially V-letter shape outer periphery. It is provided with brackets 49 extending similarly to 47. The roller attachment is provided with rollers at the inside of "V".

The bracket members, for instance shown in FIGS. 17 through 23, make the roller attachment in accordance with the invention applicable to all the more various shapes, sizes and weights of articles.

In addition, these bracket members may be useful to fix the roller attachments to a stationary supporting structure (not shown), instead that they are fixed to articles 2 to move along a guide line. In this case, articles 2 of a relatively long configuration can run along the stationary supporting structure in a rolling relation to the roller attachments.

Figure 24:
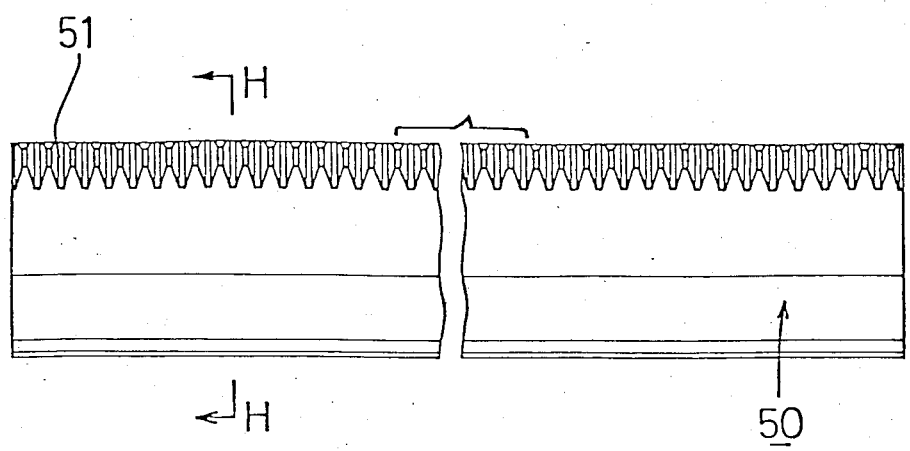
FIG. 24 is a left side view of a modification of the guide rail in FIG. 16.
Figure 25:
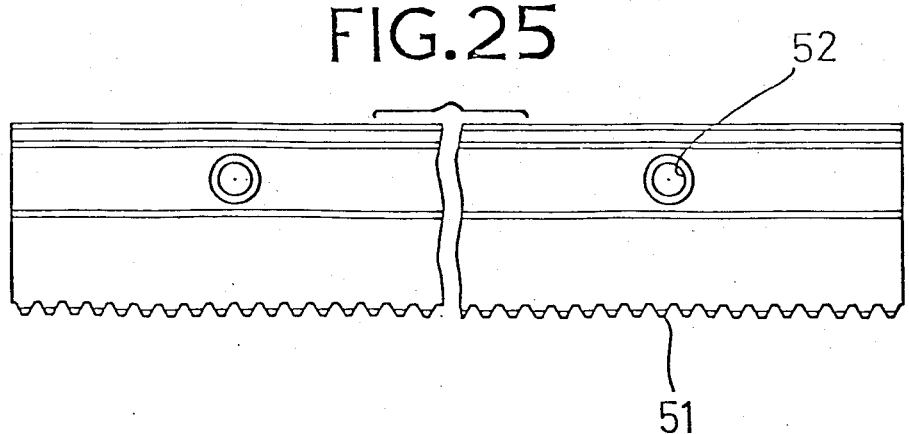
FIG. 25 is a plan view of the modification in FIG. 24.
Figure 26:
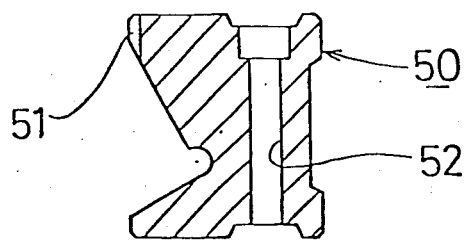
FIG. 26 is a vertical section taken approximately on the line H—H in FIG. 24.

The guide rail shown in FIGS. 24 through 26 is wholly designated as 50 and fundamentally similar to 38 in FIG. 16, except it has an upper edge which is provided with a rack gear 51.

In case the roller attachment in accordance with the invention is fixed to an article which is provided with gear driving means (not shown), the rack gear 51 is engageable with the gear of such driving means to move the article along the guide rail 50.

The guide rail 50 can be fixed to a supporting structure (not shown) with bolts (not shown) to be provided through bolts holes 52.

The guide rail 50 is an example to show a great versatility of the invention.

It will be understood that further modifications may be made in constructions of the above-given embodiments, and that the invention is in no way limited to the above-given embodiments.

What I claim is:

1. A roller device for attachment to an article to facilitate the movement of said article along at least one guide line, said roller device comprising:
   (a) an angular frame comprising a plurality of angular members layered in the direction of the motion of said roller device, the number of said plurality of angular members being variable to facilitate precise running of articles of differing shapes, sizes, and weights along said at least one guide line, and said frame having a plurality of recesses in its outer periphery, each aligned normally to said outer periphery, and also having a plurality of rivet holes aligned in the direction of said motion for receiving rivets to unite said angular members, and
   (b) a plurality of rollers mounted in said normal recesses to roll against said at least one guide line in the direction of said motion.

2. The roller device as defined by claim 1 having a plurality of second recesses perpendicularly traversing said normal recesses, said roller device further comprising a plurality of roller supporting means mounted in said second recesses for supporting said rollers in freely rotatable relation to said roller supporting means.

3. The roller device as defined by claim 2 wherein said roller supporting means comprise journal bearings having outer ends with outer peripheries of square cross-section, said second recesses have outer ends with inner peripheries of square cross-section of substantially the same dimensions as said outer peripheries, and wherein said outer ends of said journal bearings are mounted in said outer ends of said second recesses.

4. The roller device as defined by claim 3 wherein said angular members comprise a rigid plate material.

5. The roller device as defined by claim 4 wherein said frame comprises, at both ends of said frame, a pair of angular members comprising brackets integrally associated with said pair of angular members, each of said brackets having at least one elongated bolt hole for receiving bolt means to attach said frame to said article.

6. The roller device as defined by claim 4 wherein said angular members are not of uniform shape and thickness.

7. The roller device as defined by claim 4 wherein said angular members have the same thickness.

8. The roller device as defined by claim 4 further comprising a plurality of hollow rivets for insertion into said rivet holes to unite said angular members, and for receiving bolts means to attach said frame to said article.

* * * * *

UNITED STATES PATENT AND TRADEMARK OFFICE
CERTIFICATE OF CORRECTION

PATENT NO. : 4,638,741

DATED : January 27, 1987

INVENTOR(S) : Nobuyuki TSUBOI

It is certified that error appears in the above-identified patent and that said Letters Patent is hereby corrected as shown below:

At column 1, line 1 of the Title, change "Procession" to ---Processes---.

Kerckhoff---.

At column 1, line 50, change "sever" to ---serve---.
At column 1, line 26, delete "of".
At column 1, line 39, delete "of".
At column 5, line 23, change "toether" to ---together---.
At column 5, line 24, change "integrity" to ---integrality---.
At column 5, line 36, change "control" to ---central---.
At column 5, line 42, change "zigzaging" to ---zigzagging---.
At column 5, lines 53 and 61, change "zigzaging" to ---zigzagging---.
At column 6, line 14, change "minature" to ---miniature---.
At column 6, line 17, before "square", insert ---a---.

At column 7, line 54, before "edge" insert ---inner---.

UNITED STATES PATENT AND TRADEMARK OFFICE
CERTIFICATE OF CORRECTION

PATENT NO. : 4,638,741

DATED : January 27, 1987

INVENTOR(S) : Nobuyuki Tsuboi

It is certified that error appears in the above-identified patent and that said Letters Patent is hereby corrected as shown below:

At column 8, line 3, change "bolts" to ---bolt---.

At column 8, line 58, change "bolts" to ---bolt---.

Signed and Sealed this

Twenty-fourth Day of January, 1989

Attest:

DONALD J. QUIGG

*Attesting Officer*      *Commissioner of Patents and Trademarks*